United States Patent [19]

Iwasaki et al.

[11] 4,010,038

[45] Mar. 1, 1977

[54] PROCESS FOR PRODUCING MICROCAPSULES

[75] Inventors: Hiroshi Iwasaki, Kawanishi; Shunsuke Shioi, Daito; Jujiro Kouno, Takatsuki, all of Japan

[73] Assignee: Kanzaki Paper Manufacturing Co., Ltd., Tokyo, Japan

[22] Filed: Apr. 1, 1975

[21] Appl. No.: 563,974

[30] Foreign Application Priority Data

Apr. 10, 1974 Japan .............................. 49-41306

[52] U.S. Cl. .................................. 106/22; 106/19; 106/20; 106/21; 106/23; 106/24; 106/26; 106/128; 106/145; 106/158; 106/193 D; 106/197 C; 252/316; 252/188.3 R; 264/4; 424/37; 426/89; 426/102; 427/151; 427/338

[51] Int. Cl.$^2$ .................. B01J 13/02; C09D 11/00

[58] Field of Search .................. 106/19, 20, 21, 22, 106/23, 24, 26, 128, 145, 158, 193 D, 197 C; 252/316; 264/4

[56] References Cited

UNITED STATES PATENTS

| | | |
|---|---|---|
| 3,743,604 | 7/1973 | Schnoring et al. ............... 252/316 |
| 3,803,045 | 4/1974 | Matsukawa et al. ............... 252/316 |
| 3,886,085 | 5/1975 | Kiritami et al. ................... 252/316 |
| 3,888,689 | 6/1975 | Maekawa et al. ..................... 106/24 |

*Primary Examiner*—J. Ziegler
*Attorney, Agent, or Firm*—Armstrong, Nikaido & Wegner

[57] ABSTRACT

In a process for producing microcapsules of complex hydrophilic colloid material enclosing fine particles of a hydrophobic substance, the improvement characterized in that:

an acid-treated gelatin and at least one of carboxy-modified cellulose derivatives are used as the hydrophilic colloid materials, the amount of the cellulose derivative being 1/7 to 1/40 the amount of the gelatin by weight, the cellulose derivative having an average polymerization degree of 50 to 1,000 and a carboxyl substitution degree of 0.4 to 1.5, and the coacervation of the colloid material solution is effected at a pH of 4.8 to 6.0.

6 Claims, No Drawings

PROCESS FOR PRODUCING MICROCAPSULES

This invention relates to a process for producing microcapsules enclosing fine particles of a hydrophobic substance, more particularly to an improved process for producing such microcapsules substantially without entailing formation of large clusters of microcapsules.

Methods of producing microcapsules of complex hydrophilic colloid material enclosing a hydrophobic substance are already known. The method of producing such microcapsules disclosed in U.S. Pat. No. 2,800,457, for example, comprises the steps of emulsifying and dispersing a hydrophobic substance in an aqueous solution of a hydrophilic colloid material, mixing with the dispersion an aqueous solution of another hydrophilic colloid material, thereafter causing coacervation to deposit the colloid materials around the hydrophobic substance by adjusting the pH of the resulting dispersion and/or by diluting the dispersion with water, gelling the colloid materials by cooling the dispersion to form microcapsules, and hardening the microcapsules obtained by adjusting the pH of the dispersion and by adding formaldehyde to the dispersion. The method disclosed in U.S. Pat. No. 3,341,466 comprises the steps of emulsifying and dispersing a hydrophobic substance in an aqueous solution of two hydrophilic colloid materials, thereafter forming coacervate and gelling the same in the same manner as above. However, in the preparation of microcapsules in which two kinds of hydrophilic colloid materials are separated out as a complex coacervated phase, the system which is unstable permits individual capsules to agglomerate into bunches like grapes during gelling and hardening steps, failing to give loose or unclustered capsules and therefore to prevent clustering of capsules in the end product. Clustered capsules produce troubles in various fields in which capsules are used. For example, U.S. Pats. Nos. 2,730,456, 2,730,457, etc. disclose pressure sensitive manifold papers utilizing electron donor-acceptor colour forming reaction between (1) an electron donating organic chromogenic material (hereinafter referred to as a "colour former") such as Crystal Violet lactone, Malachite green lactone and like lactone dyes, benzoyl leuco Methylene blue and like Methylene blue dyes, 3-diethylamino-7-benzylamino fluoran, 3-diethylamino-7-amino fluoran and like fluoran derivatives, benzo-$\beta$-naphtho spiropyran and like spiro compounds, 1-[bis(p-dimethylaminophenyl)methyl]pyrolidine and the auramine compounds, etc. and (2) an electron accepting acidic reactant material (hereinafter referred to as a "colour acceptor") such as kaolin, bentonite, acid clay, zeolite, activated clay, attapulgite and like acidic clay, p-phenylphenolformaldehyde resin, p-ter-butylphenolacethylene resin and like phenolic polymers, 3,5-di-($\alpha$-methylbenzyl) salicylic acid, zinc 3-phenyl-5-($\alpha$, $\alpha'$-dimethylbenzyl) salicylate and like aromatic carboxylic acid and metal salts thereof, etc. With such manifold paper, the colour former is enclosed in microcapsules which are provided on the surface of paper in the form of a coating. If the coating contains clusters of capsules, uneven distribution of the colour former will result, leading to the drawback that the manifold paper gives an obscure colour image when put to use or becomes markedly smudged during storage. Furthermore when a coating composition containing clustered microcapsules is applied to a substrate by air knife coater for the production of pressure sensitive manifold paper, the capsules are classified by the air pressure of the coater to form an irregular coating. When the manifold paper obtained is used or stored, the same drawback as above is therefore experienced. Similarly an attempt has been made to prepare an X-ray image forming barium sulfate suspension having a low viscosity and good stability by encapsulating barium sulfate with gelatin, gum arabic or the like to render the barium sulfate readily dispersible in water. For this purpose, it is greatly desired to prepare unclustered, barium sulfate-enclosing capsules of uniform particle size distribution and to make barium sulfate easily dispersible in water in stable manner, thereby assuring that the X-ray image forming agent will be highly amenable to intimate contact with the wall of the organ when put to use. Otherwise, clusters of microcapsules might possibly lead to the serious result of erroneous diagnosis. Accordingly, utmost care has been taken in controlling the particle size distribution but, as already described, the conventional method invariably permits capsules to cluster during gelling and hardening steps and consequently results in uneven particle size distribution of the capsules. Various troubles are therefore encountered.

Many proposals are made for prevention of capsules from clustering. For example, Japanese Pat. No. 315,171 discloses a method in which a thickener such as magnesium silicate, tragacantha, glycerin or the like is used in emulsifying step to sufficiently deposit a hydrophilic colloid material around fine particles of hydrophobic material. However, this method is still unable to fully inhibit clusters of capsules and to obtain unclustered capsules. It is also known to add a copolymer of vinyl methyl ether and maleic anhydride, serving as an agglomeration inhibitor, to two kinds of hydrophilic colloid materials for the preparation of microcapsules (Japanese Pat. No. 288,452), or to similarly use pectin, pectic acid, pectinic acid or the like as a shock preventing agent (Japanese Patent Publication No. 16,168/1972). Although considerably effective in suppressing clustering of microcapsules, these methods require an additional cumbersome step of incorporating the above-mentioned substances, consequently entailing an increase in the equipment cost due to the modification of the existing equipment or to the installation of new equipment as well as a substantial increase in the processing cost for the cumbersome procedure.

Accordingly, the main object of this invention is to provide a novel process for producing microcapsules free of the drawbacks of the conventional methods described above.

Another object of this invention is to provide a process for producing microcapsules substantially free from clustered capsules by using existing equipment.

Still another object of this invention is to provide a process for producing microcapsules substantially free from clustered capsules by a simple operation.

Other objects and features of this invention will become apparent from the following description.

In a process for producing microcapsules of complex hydrophilic colloid material enclosing fine particles of a hydrophobic substance, the present invention provides the improvement characterized in that an acid-treated gelatin and at least one of carboxy-modified cellulose derivatives are used as the hydrophilic colloid materials, the amount of the cellulose derivative being 1/7 to 1/40 the amount of the gelatin by weight, the cellulose derivative having an average polymerization degree of 50 to 1,000 and a carboxyl substitution degree of 0.4 to 1.5 and that the coacervation of colloid material solution is effected at a pH of 4.8 to 6.0.

Our researches have revealed that when the acid-treated gelatin and the above-specified carboxy-modified cellulose derivative are used as hydrophilic colloid materials, with the pH of the dispersion maintained at the specified value for coacervation, microcapsules are prevented from clustering into grape-like bunches during gelling and hardening steps and unclustered capsules are easily available eventually. The present invention has the great advantage that unclustered capsules can be prepared with extreme ease without using an agglomeration inhibitor or shock preventing agent and with an existing equipment, simply by using an acid-treated gelatin as one of the hydrophilic colloid materials and a carboxy-modified cellulose derivative as the other hydrophilic colloid material. Thus with the use of the specified hydrophilic colloid materials and further with the use, for example, of oily material as a hydrophobic substance having a colour former dissolved or dispersed therein or of barium sulfate as a hydrophobic substance, it has become possible to very easily unclustered microcapsules having outstanding properties for use in pressure sensitive manifold sheet or for the production of X-ray image forming agent.

Firstly, the present invention is characterized by the use of acid-treated gelatin and carboxy-modified cellulose derivative in an amount of 1/7 to 1/40, preferably of 1/8 to 1/20, the amount of acid-treated gelatin by weight. If the amount of carboxy-modified cellulose derivative is more than 1/7 or less than 1/40 the amount of acid-treated gelatin based on weight, it is no longer possible to obtain unclustered capsules. It has not been known to use two kinds of hydrophilic colloid materials in such an extremely unbalanced relative ratio. In fact this is entirely inconceivable from the prior art of encapsulation in which two known hydrophilic colloid materials are used for coacervation. Further various hardening agents such as formaldehyde, glyoxal and glutaraldehyde are usually used to strengthen the wall of capsule obtained, chiefly through the reaction of such hardening agent with gelatin. Accordingly, in the hardening reaction of the capsule wall in the gelatin-gum arabic system in a conventional method as disclosed in U.S. Pat. No. 2,800,457, it is known that gum arabic does not participate in the reaction but is released from the capsule wall (Kogyo Kagaku Zasshi, Vol. 73, No. 8 (1970), pages 1,755 to 1,758), whereas with conventional methods, the hydrophilic colloid material to be used in combination with gelatin must be employed in an amount almost equal to the amount of gelatin. (For example, U.S. Pat. No. 2,800,457 states that gelatin and gum arabic are used in the same amount). Consequently a high proportion of the hydrophilic colloid material is left out of the hardening reaction, this making it impossible to completely strengthen the capsule wall and therefore leading to the drawback that, when exposed to a high humidity, capsules rupture spontaneously or permit the enclosed substance to seep therethrough. When such capsules are used, for example, in pressure sensitive manifold sheet, the sheet becomes smudged during storage or handling and suffers various troubles in practical use. Further in the production of pressure sensitive manifold sheet, the capsule-containing aqueous dispersion prepared is usually applied, along with additives when so desired, to paper, plastic or like substrate. The manifold sheet therefore has the drawback that the gum arabic, remaining unreacted during hardening, interferes with colour forming reaction and reduces the density of the colour formed. Thus, to render the capsules fully serviceable, it has been desired to increase the gelatin content thereof to the highest possible extent. This invention provides microcapsules having a high gelatin content. In fact the capsules prepared according to this invention can be readily hardened through usual hardening reaction, are fully resistant to high humidities and have a high copying ability when used in pressure sensitive manifold sheet without interfering with the colour forming reaction.

The process of this invention has another important feature that acid-treated gelatin and carboxy-modified cellulose derivative in the above-specified proportions are subjected to coacervation at a pH of from 4.8 to 6.0. With known methods, gelatin and another colloid material are coacervated usually at an adjusted pH value of 3.0 to 4.5, for example, as disclosed in Japanese Pat. No. 521,609, whereas according to this invention the coacervate obtained tends to agglomerate and unclustered capsules are unavailable if the pH value is lower than 4.8 even at temperatures not lower than the gelling point of the gelatin used. Conversely, at pH values of above 6.0, capsules agglomerate during cooling and hardening steps and unclustered capsules are not obtainable. Thus only when the pH of the system is adjusted to the limited range of 4.8 to 6.0, loose and unclustered capsules can be obtained free of any adhesion and agglomeration throughout the entire process for the production of capsules. Indeed such unexpected effect and advantage are attainable only by using acid-treated gelatin and carboxy-modified cellulose derivative in the specified proportions given above and by conducting coacervation in the limited pH range. Unclustered capsules can be prepared more inexpensively and by a simplified process according to this invention as compared with conventional methods with which it is necessary to use an additional material such as agglomeration inhibitor or shock preventing agent. Researches have yet to be made to determine why the use of hydrophilic colloid materials in the specified proportions in the limited pH range gives unclustered capsules without permitting agglomeration.

Generally the process of this invention is practiced in the following manner. First, acid-treated gelatin is dissolved in water in the known manner to produce an aqueous solution thereof. The water may be warmed to a temperature higher than the gelling point of the gelatin so as to obtain a solution of higher concentration. The acid-treated gelatin to be used in this invention is any of those heretofore employed for the production of microcapsules in the prior art. Such gelatin is usually prepared by treating collagen with an inorganic acid such as sulfuric acid or hydrochloric acid and extracting the treated collagen from mildly hot water. Preferable among acid-treated gelatins thus obtained are those having an isoelectric point of about 7 to 9 and jelly strength of about 70 to 250 g.Bloom, especially of 90 to 200 g.Bloom, as determined by jelly strength meter of the Bloom type according to PAGI method. The concentration of the aqueous solution of gelatin, which is not particularly different from that in the prior art, is usually 0.25 to 10 wt.%, preferably 1 to 5 wt.% Subsequently, the hydrophobic substance to be encapsulated is emulsified in the aqueous solution of gelatin. Useful as the hydrophobic substance is any of those conventionally used as such and is not particularly limited, insofar as it is substantially insoluble in water, is not so reactive with the capsule forming materials used and with another substance to be encapsulated as to be objectionable to the novel process of this invention, and is wettable with the coacervate formed. Example of such substances are fish oil, lard, whale oil, beef tallow and like animal oils, olive oil, peanut oil, linseed oil, soybean oil, castor oil and like vegetable oils, petroleum, kerosene, xylene, toluene and like mineral oils, alkyl-substituted diphenylalkane, alkyl-substituted naphthalene, diphenylethane, methyl salicylate and like synthetic oils which are insoluble or substantially insoluble in water. In addition to these liquids, further examples are water-insoluble metal salts and metal oxides such as barium sulfate, fibrous materials such as asbestos, cellulose, water-insoluble synthetic polymeric materials, minerals, pigments, glasses, perfumes, spices, sterilizer compositions, physiological compositions, fertilizer compositions, etc. When microcapsules are used for example for pressure sensitive manifold sheet, the above-mentioned liquid substance is used with a colour former such as Crystal Violet lactone, etc. dissolved or dispersed therein.

An aqueous solution of carboxy-modified cellulose derivative is then added to the resulting emulsion, and the mixture is uniformly stirred. Usable as the carboxy-modified cellulose derivative in this invention are carboxymethyl cellulose, carboxyethyl cellulose, $\alpha$-dicarboxyethyl cellulose, etc., which are obtained by the reaction of OH, ONa, $CH_2OH$ or $CH_2ONa$ groups on the glucose rings of cellulose with halogenated lower aliphatic carboxylic acid such as monochloroacetic acid, monobromoacetic acid, monofluoroacetic acid, monochloropropionic acid or monochlorosuccinic acid. Also useful are carboxymethylhydroxyethyl cellulose, carboxymethylhydroxypropyl cellulose, carboxymethylmethyl cellulose, carboxyethylmethyl cellulose, carboxyethylhydroxyethyl cellulose, carboxymethylbenzyl cellulose, etc., which are obtained by substituting methyl, ethyl, propyl, butyl or like $C_{1-4}$ alkyl, hydroxyethyl, hydroxypropyl or like $C_{2-4}$ hydroxyalkyl or benzyl for some of the unsubstituted hydroxyl groups of the above-mentioned compounds, the degree of substitution being such that the compounds obtained still retain the characteristics of carboxy-modified cellulose derivatives. Among these compounds, carboxymethyl cellulose is preferable for the formation of unclustered capsules. These compounds are used singly or at least two of them may be used conjointly.

The carboxy-modified cellulose derivatives to be used in this invention must have a carboxyl substitution degree (hereinafter referred to as "substitution degree") of 0.4 to 1.5, preferably 0.6 to 1.2. With substitution degrees of above 1.5, the system are electrostatically out of balance, failing to give unclustered capsules as desired, whereas if the substitution degree is less than 0.4, the cellulose derivative has a very low solubility in water. Furthermore useful cellulose derivatives must have an average polymerization degree of 50 to 1,000 preferably of 70 to 500, because if the average polymerization degree is lower than 50, it is difficult to effect coacervation and unclustered capsules are not available, whereas if the degree exceeds 1,000, the phase separated out is unable to fully enclose the fine particles of hydrophobic substance as desired. Incomplete capsules will therefore result. Usually the cellulose derivatives are used in the form of an aqueous solution of alkali metal salt or ammonium salt. As already described, the carboxy-modified cellulose derivative is used in an amount of 1/7 to 1/40, preferably of 1/8 to 1/20, the amount of the acid-treated gelatin by weight. Alternatively, the hydrophobic substance to be encapsulated may be first emulsified in the aqueous solution of carboxy-modified cellulose derivative and the aqueous solution of acid-treated gelatin may be then added to the resulting emulsion, or a solution having dissolved carboxy-modified cellulose and acid-treated gelatin therein may be first prepared and then the hydrophobic substance may be emulsified in the resulting solution. The steps so far described are conducted usually above the gelling point of the acid-treated gelatin used.

The resulting mixture of the two kinds of colloid materials is then adjusted to a pH of 4.8 to 6.0 and is thereafter cooled to a temperature lower than the gelling point of the acid-treated gelatin used. Alternatively, after the solution having dissolved therein carboxy-modified cellulose and acid-treated gelatin is adjusted to a pH of 4.8 to 6.0 for coacervation, the hydrophobic substance may be added thereto as in the process disclosed in U.S. Pat. No. 3,341,466. The adjustment of pH of the solution can be made, as known in the art, by the addition in the form of a solution of, for example, a base such as sodium hydroxide, potassium hydroxide and like alkali metal hydroxides, ammonium, pyridine, trimethylamine and like organic bases, etc., or an acid such as acetic acid, citric acid and like carboxylic acids, hydrochloric acid, sulfuric acid, nitric acid and like inorganic acids, etc., as required. To the resulting system thus obtained is further added, for example, an aqueous solution of formaldehyde, glyoxal or glutaraldehyde according to the usual process to harden the gelled coacervate. Prior to or after the addition of formaldehyde solution to the system, the pH of the system may be adjusted to a higher value with the addition of a base for improving the hardness of the coacervate.

For a better understanding of the invention, Examples are given below to which, however, the invention is not limited in any way. All parts and percentages used in the Examples and Comparison Examples are by weight unless otherwise indicated. In the Examples and Comparison Examples, microcapsules and pressure sensitive manifold paper prepared are evaluated by identifying the defects and determining the characteristic values as stated below:

1. Clustered microcapsules in microcapsule dispersion:

The diameter of the largest cluster of microcapsules and the number of clusters per 100 capsules produced are microscopically determined.

2. Tests of microcapsules for use in pressure sensitive manifold paper:

To the microcapsule dispersion obtained in each of Examples and Comparison Examples are added 100 parts of 20% aqueous solution of oxidized starch and 15 parts of cellulose powder to prepare a colour former coating composition, which is applied in an amount of 5 g/m² when dried, to a paper substrate weighing 40 g/m² to obtain transfer sheets (top sheets). A colour acceptor coating composition is separately prepared from 100 parts of acidic clay, 10 parts of 20% aqueous solution of sodium hydroxide, 40 parts of 50% styrene-butadiene copolymer latex (styrene: butadiene = 60 : 40), 50 parts of 1% aqueous solution of sodium alginate and 200 parts of water. The colour acceptor coating composition is then applied, in an amount of 6 g/m² when dried, to a paper substrate weighing 40 g/m² to obtain copy sheets (bottom sheets). The same colour former coating composition as above is applied, in an amount of 5 g/m² when dried, to the rear surface of each of the same copy sheets prepared in the same manner as above to obtain middle sheets.

The three kinds of sheets thus prepared are tested in the following manner.

i. Colour forming ability

The transfer sheet is superposed on the copy sheet with the coatings facing each other, and the set of sheets is subjected to pressure of 600 kg/cm² to form a colour mark on the copy sheet. The density of the mark is measured by HITACHI SPECTRO PHOTOMETER, Model-124 (manufactured by HITACHI, LTD., Japan) at a light wavelength of 610 m$\mu$. The result is given in terms of absorbancy ($D_1$).

ii. Resolving power

Seven middle sheets are fitted together in layers with the colour former coatings facing the colour acceptor coatings respectively, and the pile of sheets is pressed by electric typewriter. The sharpness of the colour characters formed on the colour acceptor coating on the lowermost sheet is inspected with the unaided eye and evaluated according to the following criteria:

A: Excellent

B: Good

C: Acceptable

D: Reject iii. Pressure resistance

The transfer sheet is superposed on the copy sheet with the coatings facing each other, and the set of sheets is subjected to pressure of 40 kg/cm² to form a colour mark on the copy sheet. The density of the mark is measured by the same spectrophotometer as above at a light wavelength of 610 m$\mu$. The result is given in terms of absorbancy ($D_2$), which relates to smudging caused in the course of coating and winding-up operations for the production of middle sheet or when the sheet is cut or printed. The lower the value, the less is the susceptibility of manifold paper to smudging.

iv. Frictional smudge resistance

The transfer sheet is superposed on the copy sheet with the coating facing each other, and the transfer sheet is moved back and forth five times over a distance of 5 cm at a speed of 450 cm/min. while applying pressure of 55 g/cm² to the transfer paper on its uncoated surface. The colour smudge formed on the copy sheet is inspected with the unaided eye and evaluated according to the following criteria:

A: Excellent

B: Good

C: Acceptable

D: Reject v. Fogging characteristics

Expressed in terms of $D_2/D_1$ x 100, namely the ratio of the colour density produced at pressure of 40 kg/cm² to that produced at pressure of 600 kg/cm². The higher the value, the more susceptible is the manifold paper to fogging, hence less amenable to processing.

EXAMPLE 1

To 225 parts of water is added 25 parts of acid-treated gelatin (isoelectric point: 8, jelly strength: 180 g·Bloom), and after leaving the mixture at 10° C 1 hour, 530 parts of water is added thereto. The mixture is then heated at 60° C to prepare a solution. Separately, 2 parts of Crystal Violet lactone and 1 part of benzoyl leuco Methylene Blue are dissolved in 30 parts of kerosene and 70 parts of isopropylnaphthalene, and the solution is heated to 60° C and then added to the gelatin solution. The mixture is stirred to prepare an emulsion containing oily droplets 5 to 10 $\mu$ in mean particle size. Further separately, 5% aqueous solution of carboxymethyl cellulose (average polymerization degree: 150, substitution degree: 0.6) is prepared, and 50 parts of the solution (amount of the carboxymethyl cellulose: 1/10 the amount of the gelatin by weight) is added to the emulsion with stirring to obtain a system having a pH of 4.3. The system is adjusted to a pH of 5.5 with a 5% aqueous solution of sodium hydroxide and then cooled to 10° C. After adding 25 parts of 10% aqueous solution of formaldehyde to the system, the mixture is left to stand for 5 minutes. Adjustment of the mixture to a pH of 10 with dropwise addition of 10% aqueous solution of sodium hydroxide gives a dispersion of highly hardened capsules. Microscopic inspection of the dispersion reveals that it contains loose and unclustered capsules with uniform particle size distribution and entirely free from clusters. The pressure sensitive manifold paper prepared with the use of the capsule dispersion gives a colour image of uniform and high density and is free of any smudging when stored for a long period of time. Table 1 shows the characteristics of the microcapsule dispersion and the properties of the manifold paper prepared with the use of the dispersion, along with the results achieved in Examples 2 to 7 and Comparison Examples 1 and 2.

EXAMPLE 2

In 530 parts of water is dissolved 2.5 parts of carboxymethyl cellulose (polymerization degree: 150, substitution degree: 0.6), and the solution is heated to 60° C. A mixture of 30 parts of kerosene and 70 parts of isopropylnaphthalene having dissolved therein 2 parts of Crystal Violet lactone and 1 part of benzoyl leuco Methylene Blue is added to the solution to prepare an emulsion, which is then adjusted to a pH of about 7 with dropwise addition of 10% aqueous solution of sodium hydroxide. To the emulsion is thereafter added 250 parts of 10% aqueous solution of acid-treated gelatin (isoelectric point: 8, jelly strength: 150 g·Bloom) at 60° C. Adjustment of the resulting system to a pH of 5.5 with a 10% acetic acid, cooling of the system and addition of formaldehyde solution are followed by the same procedure as in Example 1 to obtain a capsule dispersion.

EXAMPLE 3

To 700 parts of water are added 25 parts of acid-treated gelatin (isoelectric point: 8, jelly strength: 130 g·Bloom) and 2.5 parts of carboxymethyl cellulose (average polymerization degree: 150, substitution degree: 0.6), and the mixture is heated to 60° C to prepare a solution having a pH of 4.7. To the solution thereafter adjusted to a pH of 5.5 with a 5% aqueous solution of sodium hydroxide is added a mixture consisting of 30 parts of kerosene, 70 parts of isopropylnaphthalene, 2 parts of Crystal Violet lactone and 1 part of benzoyl leuco Methylene Blue to formulate an emulsion, which is cooled to 10° C and further treated in the same manner as in Example 1, whereby a capsule dispersion is prepared.

EXAMPLES 4 TO 7

Various capsule dispersions are prepared by the process of this invention following the same procedure as in Example 1 except that acid-treated gelatin and carboxymethyl cellulose are used in the proportions listed in Table 1.

COMPARISON EXAMPLES 1 AND 2

Two kinds of capsule dispersions are prepared in the same manner as in Example 1 except that acid-treated gelatin and carboxymethyl cellulose are used in the proportions given in Table 1.

EXAMPLE 8

A capsule dispersion is formulated in the same manner as in Example 1 except that acid-treated gelatin (isoelectric point: 7.8, jelly strength: 180 g·Bloom) and carboxymethyl cellulose (average polymerization degree: 500, substitution degree: 0.7) are used. Table 2 shows the characteristics of the capsule dispersion and the properties of the manifold paper prepared with the use of the dispersion, along with the results achieved in Examples 9 to 12 and Comparison Examples 3 to 5.

EXAMPLES 9 TO 12

Various capsule dispersions are prepared in the same manner as in Example 8 except that carboxymethyl celluloses of varying average polymerization degrees and substitution degrees are used as listed in Table 2.

Table 1

|  | Propor-*1 tion of carboxymethyl cellulose | Capsule dispersion | | Pressure sensitive manifold paper | | | | |
|---|---|---|---|---|---|---|---|---|
|  |  | Maximum diameter of clusters ($\mu$) | Number*2 of clusters | Colour forming ability | Resolving power | Pressure resistance | Frictional smudge resistance | Fogging characteristics |
| Ex. 1 | 1/10 | — | 0 | 0.96 | A | 0.05 | A | 5.2 |
| Ex. 2 | 1/10 | — | 0 | 0.96 | A | 0.05 | A | 5.2 |
| Ex. 3 | 1/10 | — | 0 | 0.95 | A | 0.05 | A | 5.3 |
| Comp. Ex. 1 | 1/6 | 50 | 15 | 0.97 | D | 0.23 | D | 23.7 |
| Ex. 4 | 1/7 | 15 | 1 | 0.95 | A | 0.08 | B | 8.4 |
| Ex. 5 | 1/15 | — | 0 | 0.97 | A | 0.05 | A | 5.2 |
| Ex. 6 | 1/20 | — | 0 | 0.96 | A | 0.05 | A | 5.2 |
| Ex. 7 | 1/40 | 15 | 3 | 0.96 | B | 0.09 | B | 9.4 |
| Comp. Ex. 2 | 1/50 | 60 | 20 | 0.95 | D | 0.27 | D | 28.4 |

Note:
*1Based on the weight of acid-treated gelatin.
*2Per 100 capsules.

Table 1 indicates that the dispersions prepared in Examples contain loose and unclustered capsules with uniform particle size distribution and almost free from clusters. The manifold papers prepared are also satisfactory in various properties. With Comparison Examples, the dispersions contain many clusters of capsules and it is impossible to obtain unclustered capsules with uniform particle size distribution. The manifold papers prepared with use of such dispersions are not satisfactory for use.

COMPARISON EXAMPLES 3 TO 5

Various capsule dispersions are prepared in the same manner as in Example 8 except that carboxymethyl celluloses of varying average polymerization degrees and substitution degrees are used as listed in Table 2.

Table 2

|  | Carboxymethyl cellulose | | Capsule dispersion | | Pressure sensitive manifold paper | | | | |
|---|---|---|---|---|---|---|---|---|---|
|  | Average polymerization degree | Substitution degree | Maximum diameter of clusters ($\mu$) | Number* of clusters | Colour forming ability | Resolving power | Pressure resistance | Frictional smudge resistance | Fogging characteristic |
| Ex. 8 | 500 | 0.7 | — | 0 | 0.96 | A | 0.05 | A | 5.2 |
| Comp. Ex. 3 | 300 | 0.3 | 80 | 50 | 0.97 | D | 0.30 | D | 30.9 |
| Ex. 9 | 200 | 0.4 | 15 | 1 | 0.97 | B | 0.08 | B | 8.3 |
| Ex. 10 | 200 | 1.0 | — | 0 | 0.96 | A | 0.04 | A | 4.2 |
| Ex. 11 | 50 | 1.5 | 15 | 1 | 0.96 | B | 0.08 | B | 8.3 |
| Comp. Ex. 4 | 150 | 2.0 | 40 | 20 | 0.97 | D | 0.19 | D | 19.6 |
| Ex. 12 | 800 | 1.2 | 20 | 2 | 0.95 | B | 0.09 | B | 9.5 |
| Comp. Ex. 5 | 1200 | 0.9 | 100 | 80 | 0.98 | D | 0.32 | D | 32.7 |

Note:
*Per 100 capsules.

As will be apparent from Table 2, the dispersions prepared in Examples contain loose and unclustered capsules with uniform particle size distribution and free from clusters. The manifold papers prepared using the dispersions are also found fully serviceable for practical use. The dispersions obtained in Comparison Examples all contain many clusters of capsules and it is impossible to obtain unclustered capsules with uniform particle size distribution. The manifold papers prepared with the use of such dispersions are therefore found to be unserviceable in any way.

EXAMPLES 13 AND 14

Capsule dispersions are formulated in the same manner as in Example 1 except that coacervation is effected at varying pH values as listed in Table 3. The capsule dispersions are microscopically inspected, and pressure sensitive manifold papers are prepared using the dispersions and then tested. Table 3 also shows the results as well as the corresponding results achieved in Comparison Examples 6 and 7 to follow.

COMPARISON EXAMPLES 6 AND 7

Capsule dispersions are prepared in the same manner as in Example 1 except that coacervation is effected at pH values outside the range specified in the present invention.

As will be apparent from Table 3, the dispersions of Examples contain loose and unclustered capsules with uniform particle size distribution and almost free from clusters, whereas those of Comparison Examples both contain many clusters of capsules and it is impossible to obtain unclustered capsules with uniform particle size distribution.

EXAMPLES 15 TO 22

Capsule dispersions are prepared in the same manner as in Example 1 except that in place of carboxymethyl cellulose various carboxy-modified cellulose derivatives are used in ratios relative to acid-treated gelatin as listed in Table 4 and that coacervation is effected at varying pH values given in the same table. Table 4 shows the results of microscopic inspection of the capsule dispersions obtained and Table 5 shows the results of tests conducted for the pressure sensitive manifold papers produced with the use of the dispersions.

As will be apparent from Table 4, the dispersions of Examples contain loose and unclustered capsules with uniform particle size distribution and almost free from clustered capsules.

Table 4

| | | Carboxy-modified cellulose derivative | | | | Capsule dispersion | |
|---|---|---|---|---|---|---|---|
| | Kind | Average polymerization degree | Substitution degree | Ratio*¹ | pH value | Maximum diameter of clusters ($\mu$) | Number*² of clusters |
| Ex. 15 | Carboxyethyl cellulose | 300 | 0.9 | 1/9 | 5.5 | 15 | 1 |
| Ex. 16 | Carboxyethyl cellulose | 100 | 1.2 | 1/18 | 5.2 | 15 | 1 |
| Ex. 17 | Carboxymethyl-hydroxyethyl cellulose | 150 | 0.4 | 1/10 | 4.9 | 18 | 2 |
| Ex. 18 | Carboxymethyl-hydroxyethyl cellulose | 100 | 1.5 | 1/15 | 5.8 | 15 | 3 |
| Ex. 19 | Carboxymethyl-hydroxyethyl cellulose | 80 | 1.0 | 1/7 | 5.0 | 12 | 2 |
| Ex. 20 | Carboxymethyl-hydroxypropyl cellulose | 500 | 0.7 | 1/10 | 5.5 | 15 | 1 |
| Ex. 21 | Methylcarboxymethyl cellulose | 200 | 1.3 | 1/15 | 5.3 | 18 | 1 |
| Ex. 22 | Carboxymethyl-benzyl cellulose | 100 | 1.5 | 1/10 | 4.8 | 18 | 2 |

Note:
*¹Based on the weight of acid-treated gelatin.
*²Per 100 capsules.

Table 5

| | Pressure sensitive manifold paper | | | | Fogging characteristics |
|---|---|---|---|---|---|
| | Colour forming ability | Resolving power | Pressure resistance | Frictional smudge resistance | |
| Ex. 15 | 0.89 | B | 0.07 | B | 7.8 |
| Ex. 16 | 0.90 | B | 0.07 | B | 7.8 |
| Ex. 17 | 0.88 | A | 0.08 | B | 9.1 |
| Ex. 18 | 0.89 | B | 0.08 | B | 9.0 |
| Ex. 19 | 0.86 | A | 0.07 | B | 8.1 |
| Ex. 20 | 0.89 | B | 0.07 | B | 7.9 |
| Ex. 21 | 0.87 | B | 0.09 | B | 9.2 |

Table 3

| | | Capsule dispersion | | Pressure sensitive manifold paper | | | |
|---|---|---|---|---|---|---|---|
| | pH value | Maximum diameter of clusters ($\mu$) | Number* of clusters | Colour forming ability | Resolving power | Pressure resistance | Frictional smudge resistance | Fogging characteristics |
| Comp. Ex. 6 | 4.5 | 150 | 100 | 0.98 | D | 0.35 | D | 35.7 |
| Ex. 13 | 4.8 | 12 | 1 | 0.97 | B | 0.07 | B | 7.2 |
| Ex. 14 | 6.0 | 12 | 1 | 0.95 | B | 0.07 | B | 7.4 |
| Comp. Ex. 7 | 6.5 | 200 | 70 | 0.98 | D | 0.34 | D | 34.5 |

Note:
*Per 100 capsules

Table 5-continued

| | Pressure sensitive manifold paper | | | |
|---|---|---|---|---|
| | Colour forming ability | Resolving power | Pressure resistance | Frictional smudge resistance | Fogging characteristics |
| Ex. 22 | 0.91 | B | 0.08 | B | 9.9 |

EXAMPLE 23

In 100 ml of water is dissolved 20 g of acid-treated gelatin (isoelectric point: 8, jelly strength: 90 g·Bloom). Addition of 5 ml of Turkey red oil and 160 g of barium sulfate is followed by stirring to formulate a suspension, which is dispersed in 1.7 liters of aqueous solution of 2 g of carboxymethyl cellulose (average polymerization degree: 150, substitution degree: 0.6) at 60° C with stirring. Subsequently, the dispersion is adjusted to a pH of 5.3 and then cooled to 10° C. Ten ml of 10% aqueous solution of formaldehyde is then added to the dispersion. The mixture is left to stand for 5 minutes and is thereafter adjusted to a pH of 9 with dropwise addition of 10% aqueous solution of sodium hydroxide. The system is heated to 40° C to completely harden the coacervate formed. The microcapsules obtained have uniform particle size distribution which is substantially in coincidence with that of barium sulfate when the increments of particle sizes corresponding to the film thicknesses of capsules are excluded.

The capsules are isolated, washed and then formulated into an aqueous dispersion in usual manner for use as an X-ray image forming agent. The dispersion has high stability free of settling even when stored for a long period of time.

What we claim is:

1. In a process for producing microcapsules of complex hydrophilic colloid material enclosing fine particles of a hydrophobic substance, the improvement characterized by:
    forming a mixture containing an acid-treated gelatin and at least one carboxy-modified cellulose derivative used as the hydrophilic colloid material for coacervation, the amount of the cellulose derivative being 1/7 to 1/40 the amount of the gelatin by weight, the cellulose derivative having an average polymerization degree of 50 to 1,000 and a carboxyl substitution degree of 0.4 to 1.5, and
    effecting coacervation of the colloid material solution at a pH of 4.8 to 6.0 and at a temperature higher than the gelling point of the acid-treated gelatin.
2. The process according to claim 1 wherein said amount of the cellulose derivative is 1/8 to 1/20 the amount of the gelatin by weight.
3. The process according to claim 1 wherein said carboxy-modified cellulose derivative is at least one species selected from the group consisting of carboxymethyl cellulose, carboxyethyl cellulose, $\alpha,\beta$-dicarboxyethyl cellulose, carboxymethylhydroxyethyl cellulose, carboxymethylhydroxypropyl cellulose, carboxymethylmethyl cellulose, carboxyethylmethyl cellulose, carboxyethylhydroxyethyl cellulose and carboxymethylbenzyl cellulose.
4. The process according to claim 3 wherein said carboxy-modified cellulose derivative is carboxymethyl cellulose.
5. The process according to claim 1 wherein said cellulose derivative has an average polymerization degree of 70 to 500.
6. The process according to claim 1 wherein said cellulose derivative has a carboxyl substitution degree of 0.6 to 1.2.

* * * * *